United States Patent [19]

Fukushima et al.

[11] Patent Number: 4,961,595
[45] Date of Patent: Oct. 9, 1990

[54] ACTIVE SUSPENSION SYSTEM FOR AN AUTOMOTIVE VEHICLE WITH SLIP ANGLE DEPENDENT CONTROL FOR ENHANCED STEERING CHARACTERISTICS

[75] Inventors: Naoto Fukushima; Yukio Fukunaga; Yohsuke Akatsu; Itaru Fujimura; Masaharu Satoh, all of Kanagawa, Japan

[73] Assignee: Nissan Motor Company, Limited, Yokohama, Japan

[21] Appl. No.: 422,813

[22] Filed: Oct. 18, 1989

[30] Foreign Application Priority Data

Oct. 18, 1988 [JP] Japan ................................ 63-262249
Oct. 18, 1988 [JP] Japan ................................ 63-262250

[51] Int. Cl.$^5$ .............................................. B62D 9/02
[52] U.S. Cl. ..................................... 280/772; 280/689; 280/707
[58] Field of Search ......................... 280/772, 689, 707

[56] References Cited

U.S. PATENT DOCUMENTS

| | | | |
|---|---|---|---|
| 4,575,116 | 3/1986 | Miyata | 280/772 |
| 4,693,493 | 9/1987 | Ikemoto et al. | 280/772 |
| 4,761,022 | 8/1988 | Ohashi et al. | 280/772 |
| 4,872,701 | 10/1989 | Akatsu et al. | 280/772 |

Primary Examiner—Kenneth R. Rice
Attorney, Agent, or Firm—Foley & Lardner, Schwartz, Jeffery, Schwaab, Mack, Blumenthal & Evans

[57] ABSTRACT

An active suspension control system performs anti-rolling control in response to vehicular rolling by inducing counter rolling in a direction opposite to the vehicular body rolling direction. Magnitude of counter rolling is differentiated between front and rear suspension systems for providing desired steering characteristics. The steering characteristics is adjusted depending on the demand on stability factor in cornering.

23 Claims, 12 Drawing Sheets

ACTIVE SUSPENSION SYSTEM FOR AN AUTOMOTIVE VEHICLE WITH SLIP ANGLE DEPENDENT CONTROL FOR ENHANCED STEERING CHARACTERISTICS

CROSS REFERENCE TO THE RELATED CO-PENDING APPLICATIONS

The present invention is closely related to the technologies disclosed and claimed in the co-pending U.S. patent application Ser. No. 302,975, filed on Jan. 30, 1989, U.S. patent application Ser. No. 364,477, filed on June 12, 1989, U.S. patent application Ser. No. 365,468, filed on June 12, 1989.

BACKGROUND OF THE INVENTION

1. Field of the Invention

The present invention relates generally to an active suspension system for automotive vehicle which actively controls vehicular driving behaviour for achieving vehicle driving stability and riding comfort. More specifically, the invention relates to an active suspension system which can adjust distribution of reverse rolling moment at front and rear wheels and whereby adjust steering characteristics for enhanced cornering stability of the vehicle.

2. Description of the Background Art

European Patent First Publications Nos. 02 83 004, 02 85 153 and 02 84 053, which respectively correspond to the co-pending U.S. patent applications Ser. Nos. 169,201, filed on Mar. 16, 1988, 176,246 filed on Mar. 31, 1988 and 172,419 filed on Mar. 24, 1988, all of which have been assigned to the common owner of the present invention, discloses active suspension systems with capability of anti-rolling control. Such active suspension control systems monitors lateral acceleration exerted on the vehicle body for predicting or detecting vehicular rolling magnitude for performing anti-rolling control. The disclosed system performs anti-rolling control is performed by controlling hydraulic cylinders in order to cause vehicular rolling in a direction opposite to the vehicular rolling in response to the lateral acceleration. Such actively induced rolling in a direction opposite to vehicular rolling direction will be hereafter referred to as "reverse rolling". Reverse rolling is induced by applying control signals derived by amplifying the lateral acceleration indicative signal value with a predetermined gains which are provided to be opposite polarities between the suspensions oriented at transversely opposite side of the vehicular body.

Such active suspension system is successful in providing both of driving stability and riding comfort as well as higher stability in cornering at normal condition. However, in certain vehicular driving condition, such as emergency steering at or over critical steering speed which may leads lateral slippage of the vehicle, the prior proposed active suspension systems are not complete and leaves a room for improvement.

SUMMARY OF THE INVENTION

Therefore, it is an object of the present invention to provide an active suspension system which is adjustable of steering characteristics depending upon a demand for vehicular stability factor for providing better cornering characteristics.

In order to accomplish aforementioned and other objects, an active suspension control system, according to the present invention, performs anti-rolling control in response to vehicular rolling by inducing counter rolling in a direction opposite to the vehicular body rolling direction. Magnitude of counter rolling is differentiated between front and rear suspension systems for providing desired steering characteristics. The steering characteristics is adjusted depending on the demand on stability factor in cornering.

According to one aspect of the invention, an anti-rolling control system for an automotive suspension system comprises:

a front suspension system disposed between a vehicular body and a suspension member rotatably supporting a front wheel, the front suspension system defining a working chamber filled with a working fluid and variable of the fluid pressure within the working chamber for adjusting suspension characteristics;

a rear suspension system disposed between a vehicular body and a suspension member rotatably supporting a rear wheel, the suspension system defining a working chamber filled with a working fluid and variable of the fluid pressure within the working chamber for adjusting suspension characteristics;

first pressure control valve means associated with the working chamber of the front suspension system for controlling introduction and draining of working fluid into and from the working chamber for adjusting the fluid pressure therein;

second pressure control valve means associated with the working chamber of the rear suspension system for controlling introduction and draining of working fluid into and from the working chamber for adjusting the fluid pressure therein;

means for monitoring vehicular rolling magnitude for producing a rolling magnitude indicative signal;

means for monitoring a vehicular driving parameter representative of demand for vehicular stability factor for producing a stability factor demand indicative signal representative thereof means for deriving first and second control signals on the basis of the rolling magnitude indicative signal and first and second coefficient values order to control the first and second pressure control valve means for inducing counter rolling at a controlled magnitude, the control signal deriving means adjusting the deriving means varying the first and second coefficient values depending upon the stability factor demand indicative signal value so as to vary vehicular steering characteristics.

The control signal deriving means may detect the stability factor demand indicative signal value greater than or equal to a stability factor criterion for varying vehicular steering characteristics toward under-steer characteristics. The control signal deriving means may set the vehicular steering characteristics at light under-steer characteristics when the stability factor demand indicative signal value is smaller than the criterion.

The control signal deriving means varies ratio of counter rolling magnitude at front and rear suspension systems for varying vehicular steering characteristics. In the preferred embodiment, the control signal deriving means varies each of the first and second coefficients at least between predetermined a greater value and a smaller value on the basis of the stability factor demand indicative signal value. The control signal deriving means may compare the stability factor demand indicative signal value with a predetermined criterion for setting the greater value for each of the first and second coefficients when the stability factor demand indicative signal value is greater than or equal to the criterion, and otherwise setting the smaller value. The rolling magnitude monitoring means may practically comprise a lateral acceleration sensor for monitoring a lateral acceleration exerted on the vehicle body and producing a lateral acceleration indicative signal as the rolling magnitude indicative signal.

The stability factor demand monitoring means comprise a lateral slip angle sensor for monitoring lateral slip angle for producing a lateral slip angle indicative signal as the stability factor demand indicative signal.

The anti-rolling control system further comprises means, receiving the lateral slip angle indicative signal, for deriving a lateral slip angular velocity, and the control signal deriving means varies the first and second coefficients on the basis of the lateral slip angle indicative signal and the lateral slip angular velocity. The control signal deriving means varies the criterion to be compared with the lateral slip angle indicative signal on the basis of the lateral slip angular velocity. The control signal deriving means may vary the criterion to decrease according to increasing of absolute value of the lateral slip angular velocity when the lateral slip angle indicative signal and the lateral slip angular velocity are in the same polarities to each other, and to increase according to increasing of absolute value of the lateral slip angular velocity when the polarities of the lateral slip angle indicative signal and the lateral slip angular velocity are different from each other.

The anti-rolling control system further comprises means for monitoring steering angular velocity for generating a steering angular velocity indicative signal, and the control signal deriving means compares the steering angular velocity indicative signal with a predetermined steering angular velocity threshold for setting the first and second coefficient at equal values when the steering angular velocity is greater than ore equal to the steering angular velocity threshold. The anti-rolling control system may further comprise means for monitoring steering angular velocity for generating a steering angular velocity indicative signal, and the control signal deriving means compares the steering angular velocity indicative signal with a predetermined steering angular velocity threshold for setting first coefficient to be smaller than the second coefficient when the steering angular velocity is greater than ore equal to the steering angular velocity threshold.

According to another aspect of the invention, an anti-rolling control system for an automotive suspension system comprises:

a front suspension system disposed between a vehicular body and a suspension member rotatably supporting a front wheel, the front suspension system defining a working chamber filled with a working fluid and variable of the fluid pressure within the working chamber for adjusting suspension characteristics;

a rear suspension system disposed between a vehicular body and a suspension member rotatably supporting a rear wheel, the suspension system defining a working chamber filled with a working fluid and variable of the fluid pressure within the working chamber for adjusting suspension characteristics;

first pressure control valve means associated with the working chamber of the front suspension system for controlling introduction and draining of working fluid into and from the working chamber for adjusting the fluid pressure therein;

second pressure control valve means associated with the working chamber of the rear suspension system for controlling introduction and draining of working fluid into and from the working chamber for adjusting the fluid pressure therein;

means for monitoring vehicular rolling magnitude for producing a rolling magnitude indicative signal;

means for monitoring a vehicular driving parameter affecting for vehicular stability factor for producing a parameter signal representative thereof means for deriving first and second control signals on the basis of the rolling magnitude indicative signal and first and second coefficient values order to control the first and second pressure control valve means for suppressing vehicular rolling, the control signal deriving means varying the first and second coefficient values depending upon the parameter signal value.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
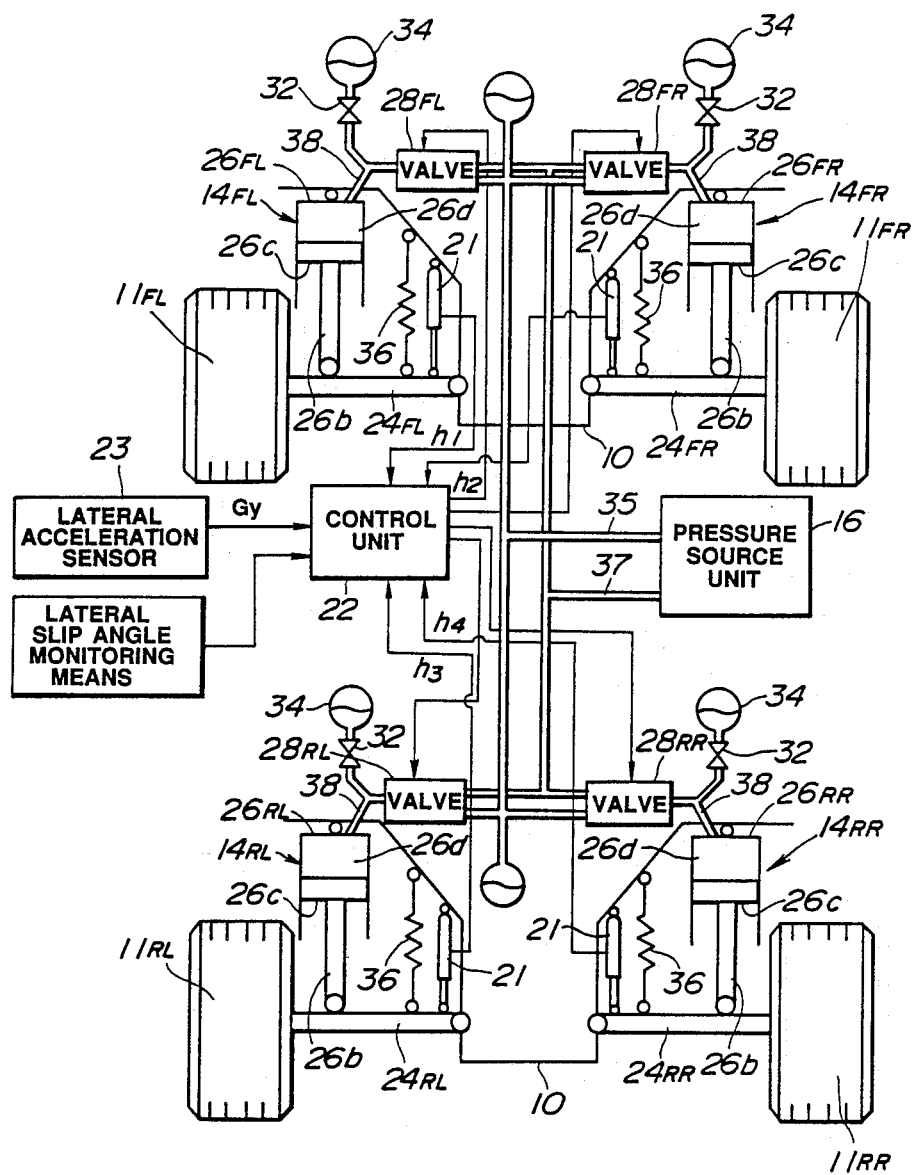
FIG. 1 is an illustration of the overall construction of the preferred embodiment of an active suspension system according to the present invention.

Referring now to the drawings, particularly to FIG. 1, the preferred embodiment of an active suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reference numeral "14" as generally referred to, and whereby suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each of the hydraulic cylinder 26 is disposed between the vehicle body 10 and the suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a upper working chamber 26d and a lower reference pressure chamber 26e. The working chamber 26d and the reference pressure chamber 26e are communicated each other via an orifice defined through the piston 26c is connected to associated one of the suspension members 24FL 24FR, 24RL and 4RR via a piston rod 26b. A suspension coil spring 36 is provided in parallel to each of the hydraulic cylinder 26. The suspension coil spring 36 employed in the shown type of the suspension is not required a resilient force sufficient for damping relative displacement between the vehicle body and the associated suspension member.

The working chamber 26d of each hydraulic cylinder 26 is connected to a hydraulic pressure source unit 16 via a pressure supply line 52, a pressure drain line 54, a pressure control valve units 28FL, 28FR, 28RL and 28RR and a pressure control line 38, which pressure control valve units will be hereafter represented by the reference numeral "28" as generally referred to, and a pressure line 38. As seen from FIGS. 1 through 3, the pressure line 38 is connected to a fluid path 26g defined through the piston rod 26b and the piston 26c. The working chamber 26d of the hydraulic cylinder 26 is further communicated with a pressure accumulator 34 via an orifice 32. Another pressure accumulators 18 are provided in the pressure supply line 52 for accumulating the excessive pressure generated by the pressure source unit 16.

The pressure control valve unit 28 comprises a proportioning valve and is designed to be controlled by an electric control signal for varying valve position according to variation of current value of the control signal. Generally, the pressure control valve unit 28 controls magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 is connected to various sensors which monitor vehicle body attitude change representative parameters to produce sensor signals. The sensors may include vehicular height sensors 21 for monitoring stroke of relative motion between the vehicle body and the suspension members 24 to produce vehicle height indicative sensor signals, and lateral acceleration sensor 23 which are designed for monitoring lateral acceleration exerted on the vehicle body to produce lateral acceleration indicative signals. As will be understood from the discussion given later, the lateral acceleration sensor 23 is longitudinally oriented at a position shifted frontwardly. While the shown embodiment employs the vehicle height sensor as the vehicular attitude change indicative parameter, the similar vehicular height indicative parameter can be monitored by a vertical acceleration sensor which monitors vertical acceleration exerted to the vehicle body, to produce vertical acceleration indicative signal for bouncing control for suppressing bounding and rebounding motion of the vehicle body. In addition, a longitudinal acceleration sensor for monitoring longitudinal acceleration exerted on the vehicle body as vehicular pitching representative parameter may be employed for anti-pitching and anti-rolling control. Furthermore, other sensors, such as a vehicular speed sensor, steering angle sensor and so forth which monitor vehicular driving condition affecting vehicular attitude may also be employed for performing various suspension control.

Figure 2:
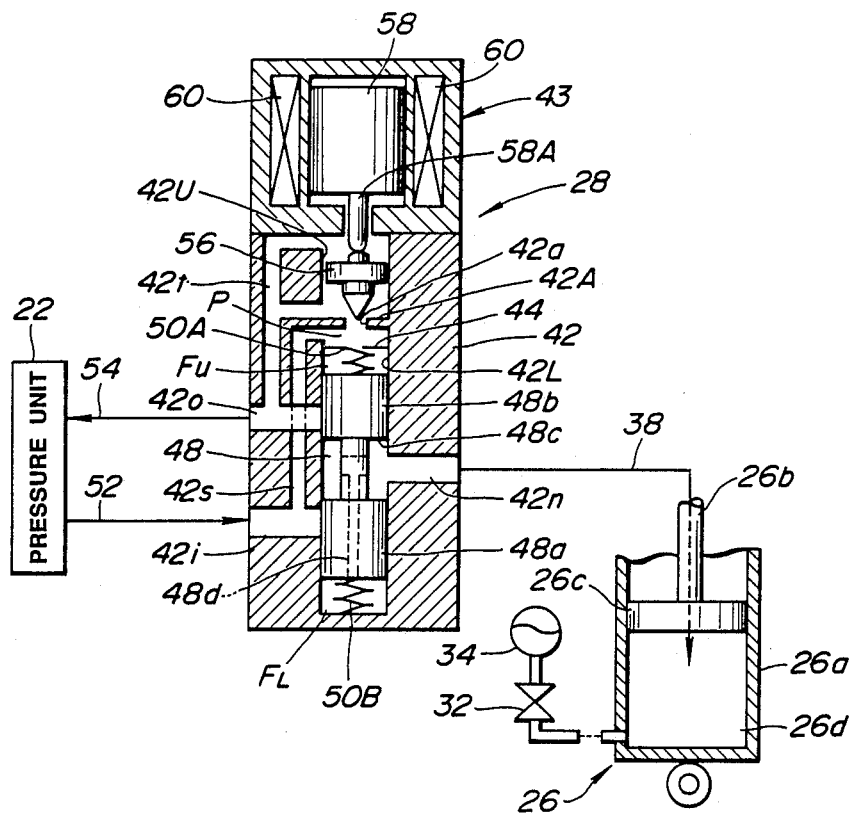
FIG. 2 is a sectional view of a pressure control valve employed in the preferred embodiment of the active suspension system of FIG. 1.

FIG. 2 shows the detailed construction of the pressure control valve unit 28 to be employed in the shown embodiment of the active suspension system set forth above.

The pressure control valve 28 comprises a valve housing 42 which housing a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with a communication hole 42a. Above the communication hole 42a is defined the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exerts spring force to the valve spool 48 for resiliently restricting movement of the latter. The valve chamber 42L is communicated with an inlet port 42i, a drain port 42o and the communication port 42n which are defined through the valve housing 42. The inlet port 42i is connected to the pressure unit 16 via a supply line 52. On the other hand, the drain port 42o is connected to the pressure unit 16 via the drain line 54.

The valve spool 48 is formed with an upper land 48b and a lower land 48a. The upper and lower lands 48b and 48a defines therebetween an annular pressure chamber 48c. The valve spool 48 is formed with a pilot path communicating the pressure chamber 48c with the lower feedback chamber FL.

A poppet valve member 56 is disposed within the control chamber 42U for thrusting or sliding movement therein. The poppet valve member 56 has a valve head opposing to the communication hole 42a. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42a according to the position of the plunger rod 58A. Therefore, the poppet valve member 56 adjusts the path area of the communication hole 42a and whereby to control fluid pressure to be introduced in the pilot chamber P. poppet valve member 56 separates the control chamber 42U into upper and lower control chambers. In order to control the position of the poppet valve 56 for adjusting the pilot pressure in the pilot chamber P, a solenoid coil 60 is provided for energizing the deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42i, the drain port 42o and the communication port 42n can be established to adjust the fluid pressure at the communication port 42n. Since the pressure at the communication port 42n is equal to the fluid pressure in the working chamber 26d of the pressure cylinder 26, the damping force created by the pressure cylinder can be adjusted. The inlet port 42i is also connected to the pilot chamber P via a fluid path 42s. On the other hand, the drain port 42o is connected to control chamber 42U via a fluid path 42t.

In order to control the pressure at the communication port 42n, a control current I is applied to the solenoid coil 60.

Figure 3:
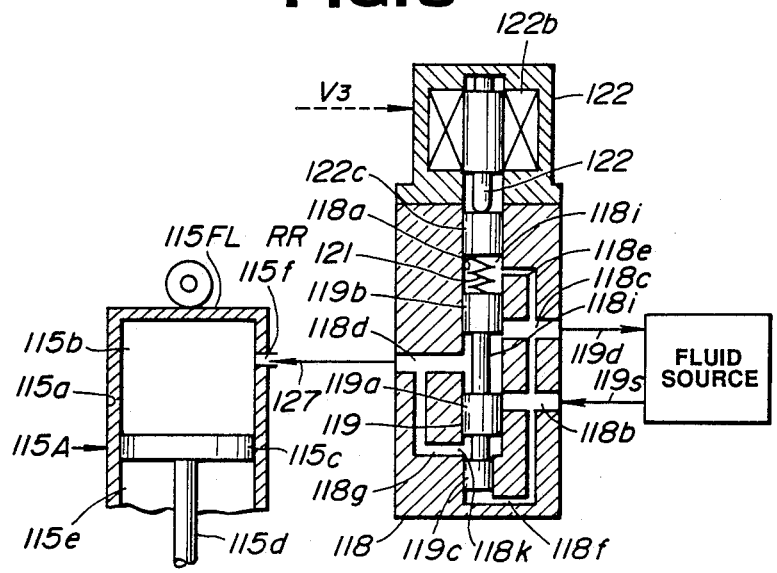
FIG. 3 is another embodiment of the pressure control valve to be employed in the preferred embodiment of the active suspension system of FIG. 1.

FIG. 3 shows alternative embodiment of the pressure control valve unit 28 to be employed in the preferred embodiment of the active suspension system, according to the invention.

FIG. 3 shows the detailed construction of the alternative embodiment of the hydraulic cylinder 115A and the pressure control valve 22. As will be seen from FIG. 3, the hollow cylinder housing 115a is formed with a port 115f communicating the upper fluid chamber 15d to an outlet port 118d of the pressure control valve 22 via a communication line 127. Though FIG. 3 does not show clear construction, the lower fluid chamber 115e is defined as an enclosed space and is filled with the viscous working fluid. The pressure of the working fluid in the lower fluid chamber 115e at an initial position of the piston 115c serves as a reference pressure and per se serves as resistance for downward movement of the piston.

The pressure control valve 22 has a valve housing 18A having the aforementioned outlet port 118d, an inlet port 118b and a drain port 118c. Respective inlet port 118b, the drain port 118c and the outlet port 118d are connected to a valve bore 118a defined within the valve housing 118A. A valve spool 119 is disposed within the valve bore 118a for thrusting movement therein. The valve spool 119 has first, second and third lands 119a, 119b and 119c. As will be seen from FIG. 3, the third land 119c has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and whereby communicated with the upper fluid chamber 115d. On the other hand, the pressure chamber 118j shifts according to shifting of the valve spool 119 to selectively communicate with the inlet port 118b and the drain port 118c. On the other hand, an pressure control chamber 118k is defined between the first and third lands 119a and 119c. The pressure control chamber 118k is in communication with the outlet port 118d via a pilot path 118g. A bias spring 122d is interposed between the actuator piston 122c and the valve spool 119. The actuator piston 122c contacts with an actuator rod 122a of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118b by means of the land 119a of the spool valve 119. On the other hand, in order to decrease the supply pressure of the working fluid, the spool valve is shifted to the position to decrease the path area at the throttle of the inner end of the inlet port 118b and opens the drain port 118 which is normally blocked by means of the land 119b of the spool valve.

As seen from FIG. 3, the proportioning solenoid 122 comprises the actuator rod 122a and a solenoid coil 122b. The solenoid coil 122b is energized by suspension control signal from the control unit. In the shown embodiment of the pressure control valve, the working fluid pressure P at the outlet port 118d is variable according to the predetermined variation characteristics. Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118d increases with a predetermined proportioning rate. Namely, by increasing of the suspension control value, the actuator rod 122a is driven downwardly in FIG. 3 at a magnitude toward to position to achieve increasing of the fluid pressure with the predetermined proportioning rate. The fluid pressure at the outlet port 118d saturate at the output pressure of the pressure unit. On the other hand, when the suspension control signal value decreases, the pressure decreases to zero to by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 122d which normally biases the actuator piston toward the actuation rod. On the other hand, the spring force of the bias spring 122d is also exerted on the valve spool 119 to constantly bias the valve spool downwardly in FIG. 3. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

Figure 4:
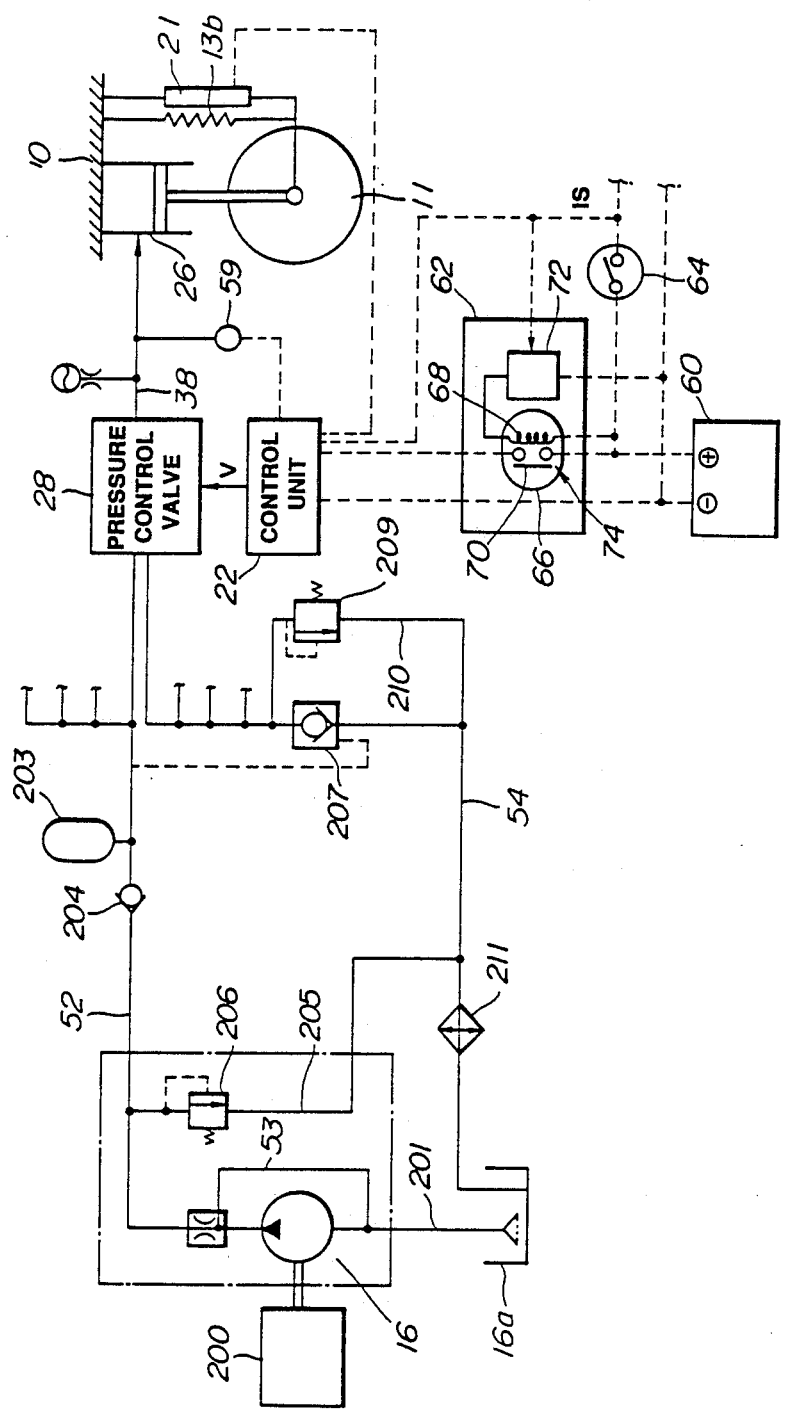
FIG. 4 is a circuit diagram of a hydraulic circuit to be employed in the preferred embodiment of the active suspension system according to the present invention.

FIG. 4 is a circuit diagram of a hydraulic circuit including the pressure source unit 16 and the working fluid chamber 26d of the hydraulic cylinder 26.

FIG. 4 shows detailed circuit construction of the preferred embodiment of the hydraulic system to be employed in the suspension control system according to the invention. As set forth, the pressure source unit includes the pressure unit 16 which comprises a fluid pump, and is connected to the reservoir 16a via a suction pipe 201 which is driven by means of an automotive engine 200. The outlet of the pressure unit 16, through which the pressurized working fluid is fed, is connected to the inlet port 42i of the pressure control valve 18 via the supply line 52. A pressure regulating orifice 202 is disposed in the supply line 52 for suppressing pulsatile flow of the working fluid and whereby regulate the output pressure of the pressure unit 16 to be delivered to the pressure control valve 28. A feedback line 53 is connected to the upstream of the pressure regulating orifice 202 at one end. The other end of the feedback line 53 is connected to the upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. An one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a give value to drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 42o and the reservoir tank 16a.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm$^2$, in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation to be taken place by the pressure source unit as set forth above will be discussed herebelow.

While the automotive engine 200 is running, the fluid pump as the pressure unit 16 is driven. Therefore, the working fluid in the reservoir tank 16a is sucked via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. When the pressure control valve 28 in a position of FIG. 2, the pressurized working fluid passes the pressure control valve and introduced into the working chamber 26d of the hydraulic cylinder 26. On the other hand, when the pressure control valve 28 is shifted to block communication between the supply line 52 and the working chamber 26d, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 16a.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

Since the shut-off valve 207, even at the open position, serves as a resistance to the fluid flow. Therefore, the fluid pressure in the drain line 54 upstream of the shut-off valve 207 becomes excessively higher, i.e. higher than the off-set pressure $P_O$. Then, the pressure relief valve 209 becomes active to open for allowing the excessive pressure of the working fluid to flow through the by-pass line 210.

When the engine 200 stops, the pressure unit 16 cease operation. By stopping of the pressure unit 16, the working fluid pressure in the supply line 52 drops. According to drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintain the suspension characteristics of the suspension systems irrespective of the engine driving condition.

Figure 5:
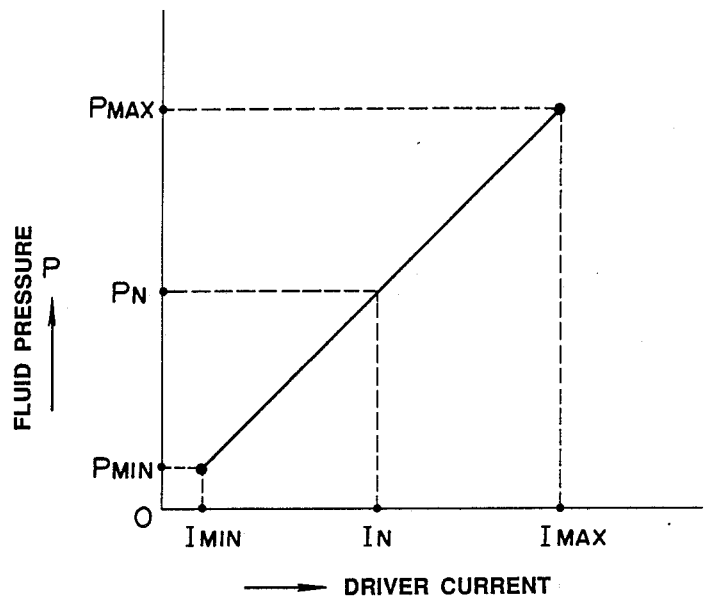
FIG. 5 is a chart showing relationship between lateral acceleration caused by steering operation and output signal values of the lateral acceleration sensors.

As seen from FIG. 5, hydraulic pressure in the working chamber 26d varies between a maximum pressure $P_{MAX}$ which is saturation pressure of the pressure source unit 16 and a minimum pressure $P_{MIN}$ which is set at a magnitude in view of a noise component to be contained in the control signal. As seen from FIG. 5, the maximum hydraulic pressure $P_{MAX}$ corresponds to the maximum current value $I_{MAX}$ of the control signal and the minimum hydraulic pressure $P_{MIN}$ corresponds to the minimum current value $I_{MIN}$ of the control signal. Furthermore, the hydraulic pressure level as labeled $P_N$ represents neutral pressure at the neutral current $I_N$. As seen, the neutral current value $I_N$ is set at an intermediate value between the maximum current value $I_{MAX}$ and the minimum current value $I_{MIN}$.

Figure 6:
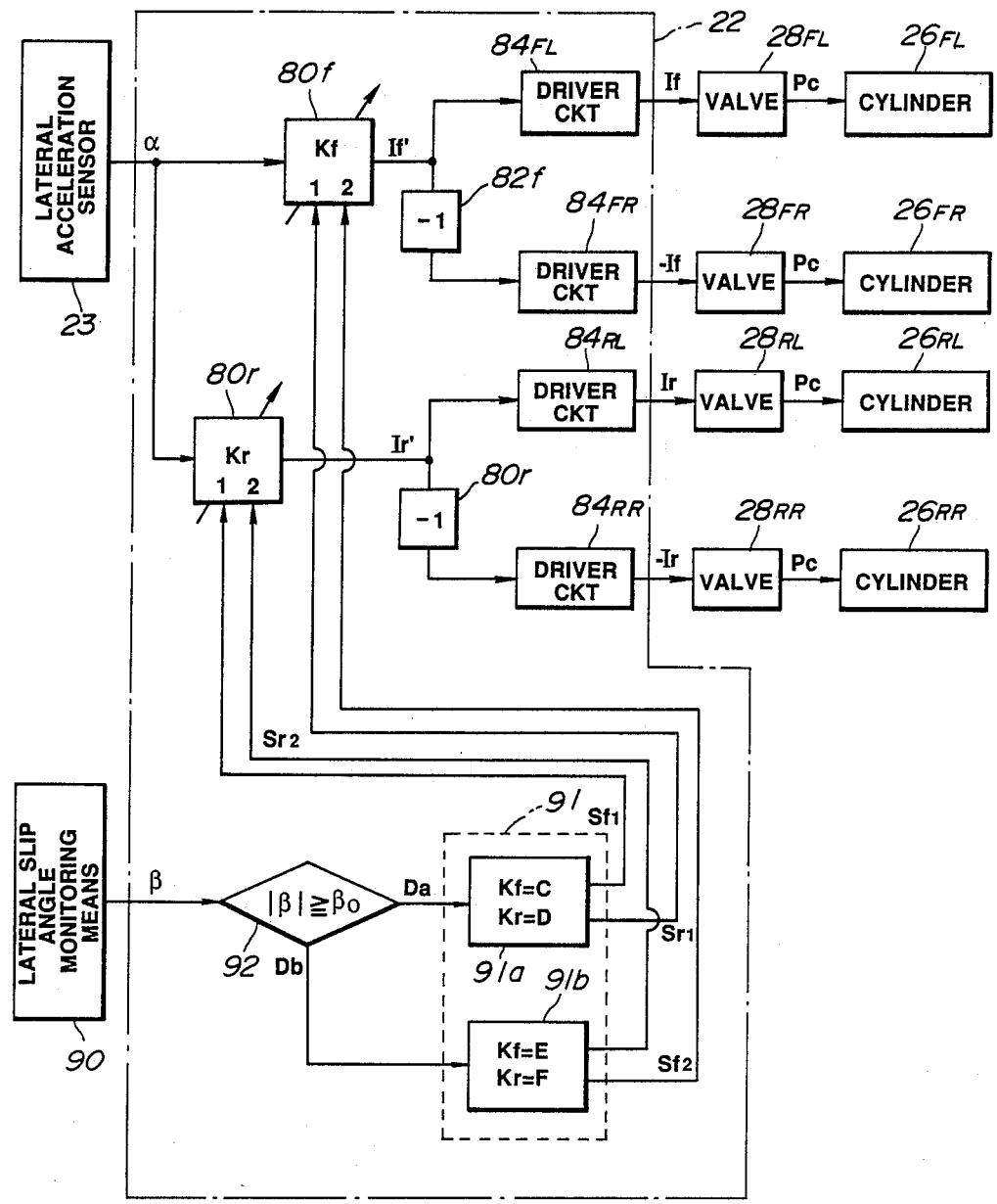
FIG. 6 is a schematic and illustrative block diagram of a control circuit to be employed in the preferred embodiment of the active suspension system according to the invention.

FIG. 6 shows a imaginary or theoritic block diagram of the control circuit for performing active suspension control in accordance with the present invention. As can seen from FIG. 6, the lateral acceleration sensor 23 is connected to the control unit 22. The control unit 22 performs anti-rolling suspension control principally based on the laterally acceleration indicative signal $\alpha$ received from the lateral acceleration sensor 23. The control unit 22 includes a gain circuit 80f for amplifying the lateral acceleration indicative signal by a predetermined gain Kf. The gain circuit 80f is connected to a driver circuit 84FL which is in turn connected to the front-left pressure control valve unit 28FL for driving the latter. The gain control circuit 80f is also connected to a driver circuit 84FR via an inverter 82f. The driver circuit 84FR is adapted to drive the front-right pressure control valve unit 28FR. Also, the control unit includes a gain circuit 80r for amplifying the lateral acceleration indicative signal $\alpha$ of the lateral acceleration sensor 23 by a predetermined gain Kr. The gain circuit 80r is connected to a driver circuit 84RL which drives the rear-left pressure control valve unit 28RL. The gain circuit 80r is also connected to a driver circuit 84RR via an inverter 82r. The driver circuit 84RR is connected to the rear-right pressure control valve unit 28RR for driving the latter. As seen from FIG. 6, the control unit 22 receives the lateral acceleration indicative signal $\alpha$ from the lateral acceleration sensor 23. The gain circuit 80f and 80r may comprise a gain controlled amplifier which may be variable of the amplifier gains by electric voltage externally exerted.

Figure 7:
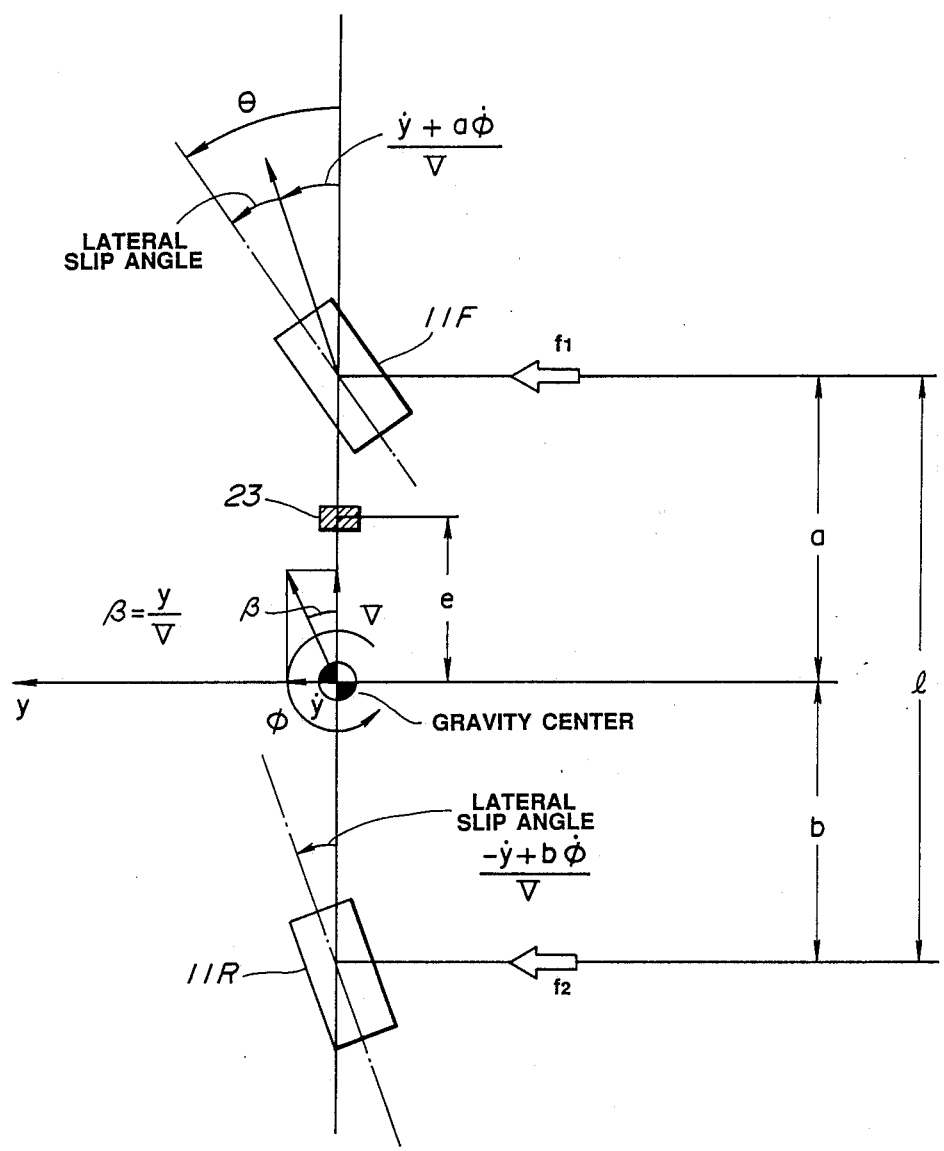
FIG. 7 is an illustration showing preferred position of the vehicular body for monitoring the lateral acceleration.
Figure 8A:
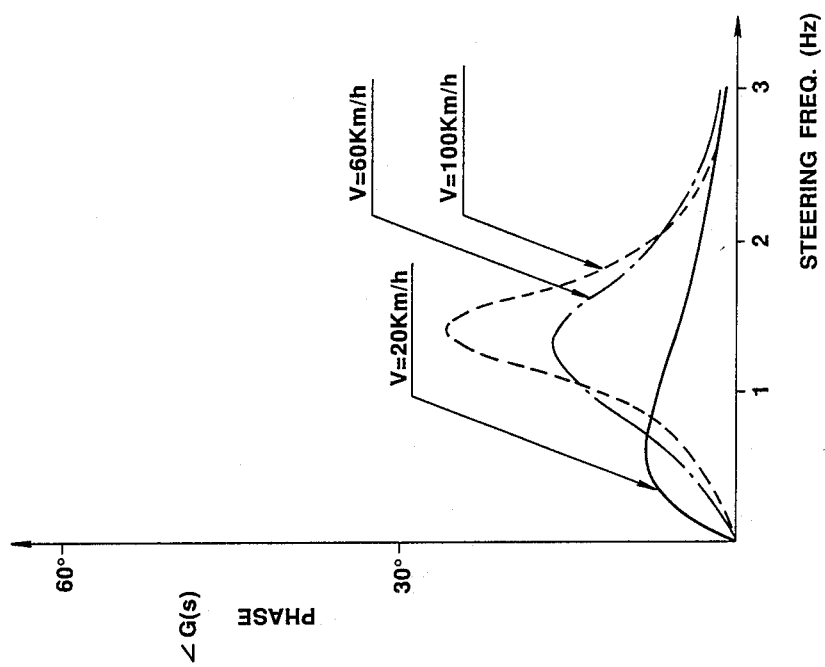
FIGS. 8(a) and 8(b) are graphs showing variation of gain and phase in response transferring coefficient of output of lateral acceleration sensor with taking vehicular speed as parameter.
Figure 8B:
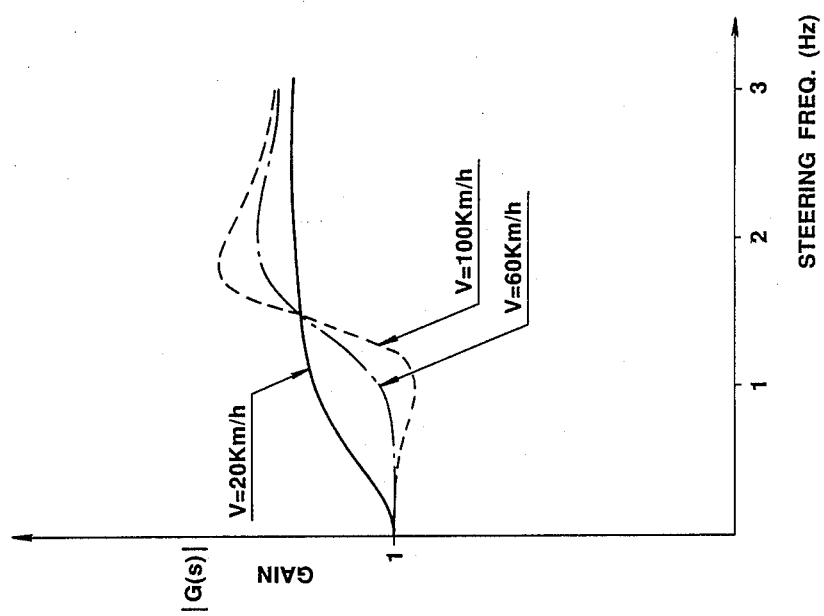
Figure 9B:
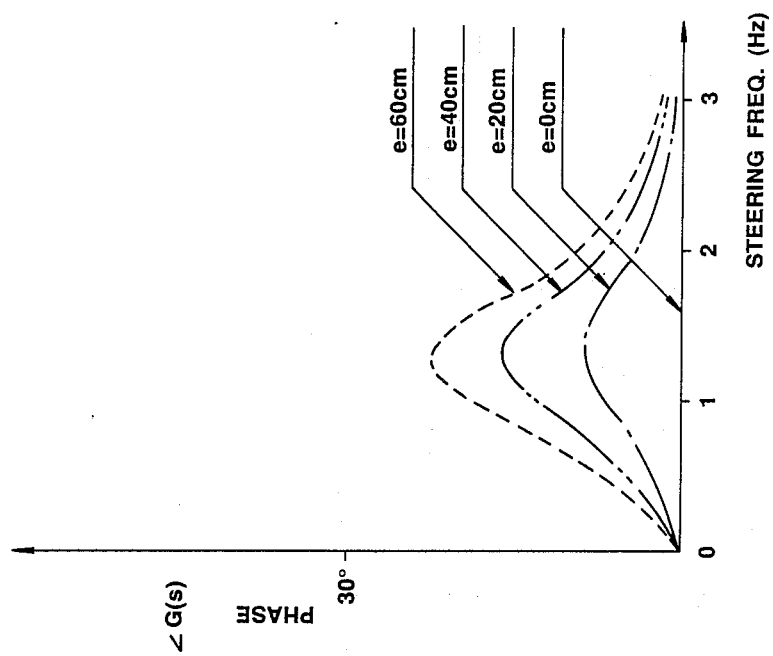
FIGS. 9(a) and 9(b) are graphs showing variation of gain and phase in response transferring coefficient of output of lateral acceleration sensor with taking a distance between the installing position and the gravity sensor as parameter.
Figure 9A:
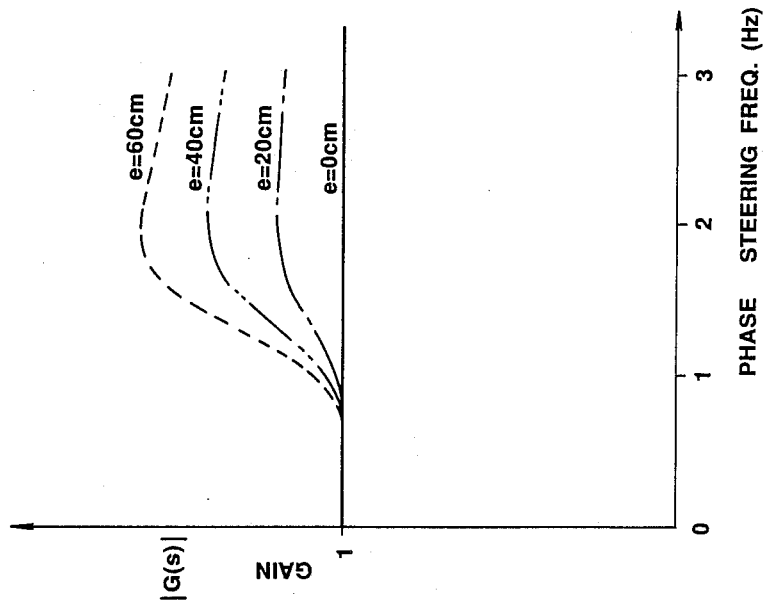

Preferred orientation of the lateral acceleration sensor 23 will be discussed herebelow with reference to FIG. 7. FIG. 7 shows a model of the vehicle in which the front-left and front-right wheels are represented by a front wheel oriented on the longitudinal axis and the rear-left and rear-right wheels are represented by a rear wheel oriented on the longitudinal axis, for simplification of the following discussion. As seen, the lateral acceleration sensor 23 is provided at a position on the longitudinal axis and shifted frontwardly in a magnitude of e from the gravity center $\dot{y}$.

In the model of FIG. 7, the following condition is set for analysis:

| | |
|---|---|
| Vehicular Weight: | M; |
| Yawing Moment at about Gravity Center: | I; |
| Wheel Base: | x |
| Distance Between Front wheel and Gravity Center: | a; |
| Distance Between Rear wheel and Gravity Center: | b; |
| Vehicle Speed: | v; |
| Cornering Power at Front Wheel: | $C_1$; |
| Cornering Power at Rear Wheel: | $C_2$; |
| Steering Angle at Front Wheel: | $\theta$; |
| Lateral Displacement of Gravity Center: | y |

Here, fundamental equations are:

$$M(\alpha + V\dot{\phi}) = f_1 + f_2 \qquad (1)$$

$$I\dot{\alpha} = af_1 + bf_2 \qquad (2)$$

where $\alpha + V\dot{\phi}$ is lateral acceleration at the gravity center, $\dot{\phi}$ is yawing rate, $\dot{\alpha}$ is yawing angular acceleration, and $f_1$ and $f_2$ are cornering force at the front and rear wheels. The cornering forces $f_1$ and $F_2$ at the front and rear wheels can be illustrated as follows:

$$f_1 = C_1\{\theta - (a\dot{\phi} + \dot{y})/V\} \qquad (3)a$$

$$f_2 = C_2\{-(\alpha + b\dot{\phi})/V\} \qquad (3)b$$

wherein $\theta - (a\dot{\phi} + \dot{y})/V$ is lateral slip angle at the front wheel and $-(\alpha + b\dot{\phi})/V$ is lateral slip angle at the rear wheel.

Here, the lateral slip angle $\beta$ at the gravity center can be illustrated by:

$$\beta = y/V$$

The lateral slip angle $\beta$ increases in counterclockwise direction.

For deriving the lateral acceleration $\alpha + V\dot{\phi}$ and yawing rate $\dot{\phi}$ in relation to the actual steering angle $\theta$, Laplace transformation is made $$(\alpha + V\dot{\phi})/\theta = \qquad (4)$$

$$\{A_2\omega_n^2 (sd^2 + 2\xi_2\omega_2 s + \omega_2^2/\omega_2^2)/(s^2 + 2\xi_n\omega_n s + \omega_n^2)$$

$$\dot{\phi}/\theta = A_1\omega_n^2 (1 + \tau_1 s)\}/(s^2 + 2\xi_n\omega_n s + \omega_n^2) \qquad (5)$$

where $$\omega_n = (1/V)C_1C_2(1+K_sV^2)/IM^{\frac{1}{2}}$$

$$\xi_n = \{(C_1+C_2)I+(a^2C_1+b^2C_2)M\}/2I\,IMC_1C_2(1+K_sV^2)^{\frac{1}{2}}$$

$$A_2 = V^2/\{l(1+K_sV^2)\}$$

$$A_1 = V/\{l(1+K_sV^2)\}$$

$$\omega_2 = (lC_2/I)^{\frac{1}{2}}$$

$$\xi_2 = (b/2V)(lC_2/I)^{\frac{1}{2}}$$

$$\tau_1 = (aMV)/lC_2$$

$$K_s = (M/l^2)(b/C_1 - a/C_2)$$

When the lateral acceleration sensor 23 is facilitated at the orientation as shown in FIG. 10, the lateral acceleration monitored by the lateral acceleration sensor 23 becomes a sum of the lateral acceleration $\alpha + V\dot{\phi}$ and lateral acceleration $e\dot{\alpha}$ generated by yawing angular acceleration $\dot{\alpha}$. Therefore, the lateral acceleration $(\alpha + V\dot{\phi} + e\dot{\alpha})$. Therefore, when transferring function Gs is set at a ratio of the lateral acceleration $(\alpha + V\dot{\phi})$ at the gravity center and the lateral acceleration $(\alpha + V\dot{\phi} + e\dot{\alpha})$ monitored by the lateral acceleration sensor, the transferring function can be described by $$Gs = (\alpha + V\dot{\phi} + e\dot{\alpha})/(\alpha + V\dot{\phi}) = \quad (6)$$

$$\{(A_2/\omega_2^2 + eA_1\tau_1)s^2 + A_2/\omega_2 2\xi_2 + eA_1)s + A_2\}/\{(A_2/\omega_2^2)s^2 + (A_2/\omega_2)2\xi_2 s + A_2\}$$

Figure 10B:
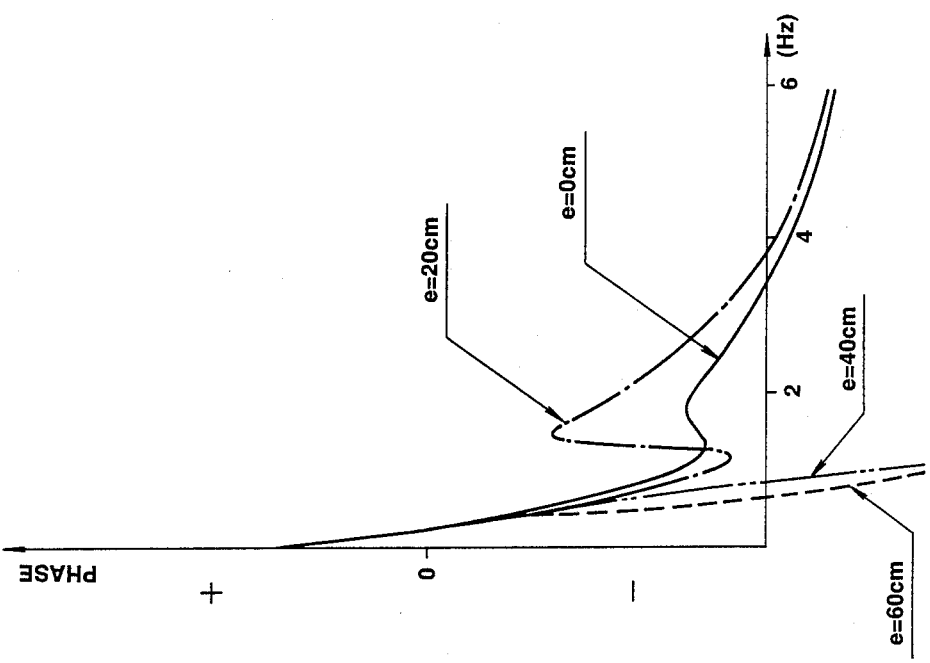
FIGS. 10(a) and 10(b) are graphs showing response transferring coefficient of rolling rate versus actual steering angle.
Figure 10A:
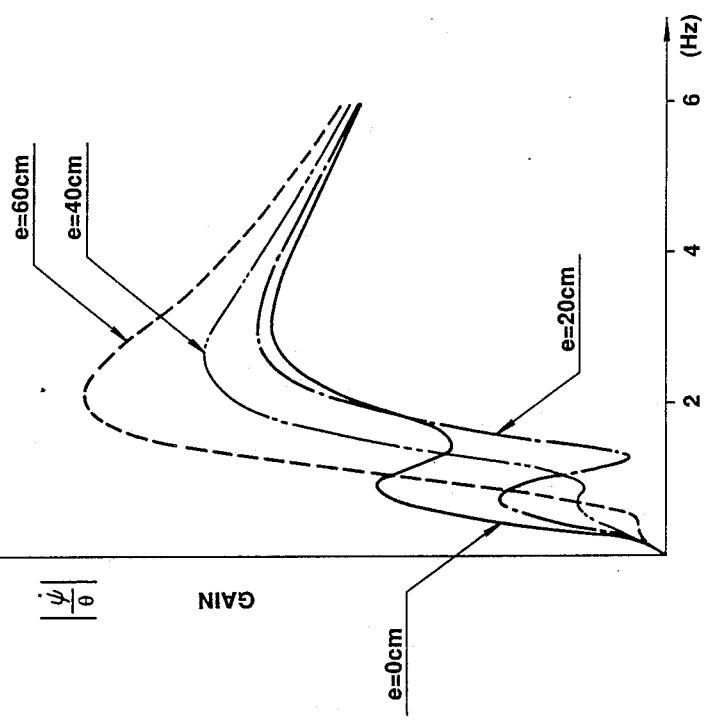

Utilizing the equation (6) and with taking vehicle speed V and the distance e between the gravity center and the sensor position as parameters, characteristics of gain and phase as illustrated in FIGS. 8(a), 8(b) and 9(a), 9(b) could be obtained. As seen from FIGS. 8(a), 8(b) and 9(a), 9(b), gain became greater and phase advance was improved by increasing the distance e. Phase advance is also improved at higher vehicle speed for quick steering operation which has general characteristics of 1 to 2 Hz. On the other hand, rolling rate characteristics $\gamma$ in relation to the actual steering angle $\theta$ is variable depending upon steering frequency and the distance e, as shown in FIGS. 10(a) and 10(b). Except for the racing cars, usual steering frequency is less than or equal to 2 Hz. In order to make $\gamma/\theta$ smaller, the distance e has to be selected at an appropriate distance. The appropriate distance in this view point is variable depending upon the specification of the vehicles to apply. However, in general, for the passenger's car, the frequency at around 1 Hz is important. As will be appreciated, the roll gain will become excessive when the distance e becomes excessively longer. Therefore, the preferred range of the distance e is 20 to 40 cm from the gravity center.

Returning to FIG. 6, the control unit is also connected to a lateral slip angle sensor 90 which monitors lateral slip angle for producing a lateral slip angle indicative signal $\beta$. The lateral slip angle sensor 90 comprises sensors respectively monitoring lateral and longitudinal accelerations and an arithmetic circuit which performs arithmetic operation for deriving the lateral slip angle $\beta$ through the equations set forth above. In the shown embodiment, the polarity of the lateral slip angle indicative signal $\beta$ becomes position when the steering direction is right and negative when the steering direction is left.

The control unit 22 has a gain control circuit 91 for producing gain control signals $S_1$ and $S_2$ for adjusting gains Kf and Kr of the gain circuits 80f and 80r. The control unit 22 also has a discriminator circuit 92. The discriminator circuit 92 is set a reference slip angle indicative value $\beta_0$ to be compared with the lateral slip angle indicative signal $\beta$. In practice, the discriminator circuit 92 compares an absolute value $|\beta|$ of the lateral slip angle indicative signal with the reference slip angle indicative value $\beta_0$. The discriminator circuit 92 outputs HIGH level first discriminator signal Da and LOW level second discriminator signal Db when the absolute value $|\beta|$ is greater than the reference slip angle indicative value $\beta_0$ and LOW level first discriminator signal and HIGH level second discriminator signal when the absolute value is smaller than the reference slip angle indicative value.

The gain control circuit 91 has a first gain control signal generator 91a and a second gain control signal generator 91b. The first gain control signal generator circuit 91a is responsive to HIGH level first discriminator signal Da for producing a first front gain control signal Sf$_1$ and a first rear gain control signal Sr$_1$ for setting the gains Kf and Kr of the gain circuits 80f and 80r at preset values C and D. The preset value C is set at a greater value than the preset value D. The second gain control signal generator circuit 91a is responsive to HIGH level second discriminator signal Db for producing a second front gain control signal Sf$_2$ and a second rear gain control signal Sr$_2$ for setting the gains Kf and Kr of the gain circuits 80f and 80r at preset values E and F. The preset value E is set at a slightly greater value than the preset value F. The difference between E and F is much smaller than that between C and D. In practice, the preset values C and D are set for providing heavier under-steer characteristics for the vehicle. On the other hand, the preset values E and F are set for providing lighter under-steer characteristics. In the shown embodiment, since the wheel load distribution at respective wheels, characteristics of the hydraulic cylinders, loop gain of the hydraulic circuit, spring characteristics are preliminary determined, the values C, D, E and F are set at values for satisfying (C/D)>(E/D)>1.

Here, as will be appreciated, by adjusting gains Kf and Kr for the gain circuits 80f and 80r, moment of counter rolling can be adjusted. This corresponds to adjustment of rolling stiffness distribution between the front and rear wheels. Namely, when the gain Kf is set greater than the gain Kr, the transverse load shift at the front wheel becomes greater than that at the rear wheels to increase a stability factor Ks for shifting cornering characteristics toward under-steer characteristics On the other hand, when the gain Kr is set greater than the gain Kf, the transverse load shift at the rear wheel becomes greater than that at the front wheels to decrease a stability factor Ks for shifting cornering characteristics toward over-steer characteristics. Furthermore, when the gain Kf is set equal to the gain Kr, the transverse load shift at the front wheel becomes equal to that at the rear wheels maintain cornering characteristics at neutral steer characteristics.

Assuming that the vehicle is driven smooth road at normal condition, the lateral slip angle $\beta$ is maintained at small value. Therefore, first discriminator signal Da is held LOW and the second discriminator signal Db is held HIGH. As long as this condition is maintained, the second gain control signal is held active to provide the second front gain control signal Sf$_2$ and the second rear gain control signal Sr2 for maintain the gain Kf of the gain circuit 80f slightly greater than that Kr of the gain circuit 80r. Therefore, cornering characteristics of the vehicle is maintained at light under-steer characteristics.

As long as the vehicle goes straight, the lateral acceleration $\alpha$ is held substantially zero (0). Therefore, the fluid pressure in the hydraulic cylinders 26FL, 26FR, 26RL and 26RL are held neutral values. At this condition, absorption of road shock is performed by the effect of accumulator and shifting of the spool valves 119.

When moderate steering operation is performed for right-hand cornering, positive lateral acceleration indicative signal $\alpha$ is generated by the lateral acceleration sensor 23. At this time, since the lateral slip angle $\beta$ is held smaller than the reference slip angle indicative value $\beta_0$, the gains Kf of the Kr of the gain circuits 80f and 80r are maintained at E and F. Therefore, the antirolling control signal current values If' and Ir' are respectively $(\alpha \times E)$ and $(\alpha \times F)$. Therefore, the driver circuits 84FL, 84FR, 84RL and 84RR respectively feeds driver current If, $-$If, Ir and $-$Ir to respectively associated pressure control valve 28FL, 28 FR, 28RL and 28RR. As a result, the fluid pressure in the front-left and rear-left hydraulic cylinders 26FL and 26RL becomes higher than the neutral pressure and the fluid pressure in the front-right and rear-right hydraulic cylinders 26FR and 26RR becomes lower than the neutral pressure for causing counter rolling to suppress vehicular body rolling.

Figure 11:
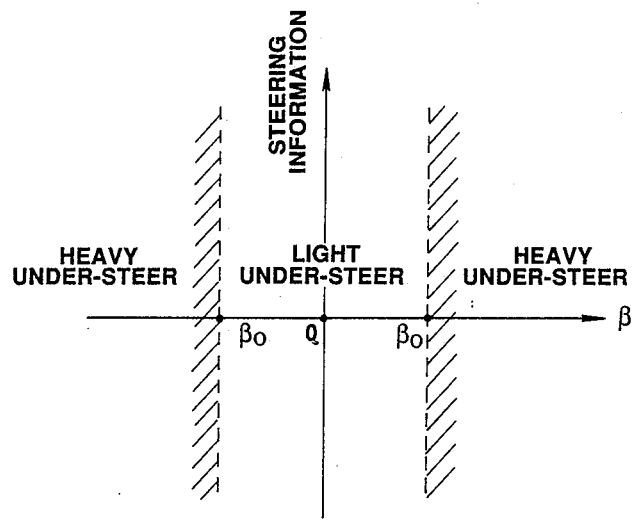
FIG. 11 is a chart showing relationship between a slip angle and steering characteristics.

As set forth, during the cornering with moderate steering, since the steering characteristics is determined by the active second gain control signal generator 91b, the cornering characteristics of the vehicle is maintained at light under-steer characteristics, as will be seen from FIG. 11.

On the other hand, when abrupt steering operation as emergency steer or so forth with steering speed higher than or equal to critical speed, the lateral slip angle $\beta$ is grown to be greater than the reference slip angle indicative value $\beta_0$. As a result, the first discriminator signal Da turns into HIGH level and the second discriminator signal Db turns into LOW level. Therefore, the first gain control signal generator 91a becomes active to output the first front gain control signal Sf1 and the first rear gain control signal Sr1. As a results, the gains Kf and Kr of the gain circuits 80f and 80r are set respectively at C and D. Therefore, the gain Kf becomes much greater than the gain Kr for providing heavier under-steer characteristics of the vehicle. By providing heavier under-steer characteristics which is shown as regions a and b in FIG. 11, spinning of the vehicle or lateral slip can be successfully prevented. Therefore, the shown embodiment of the active suspension system can provide higher or improved stability even at tight cornering or emergency steering.

Figure 12:
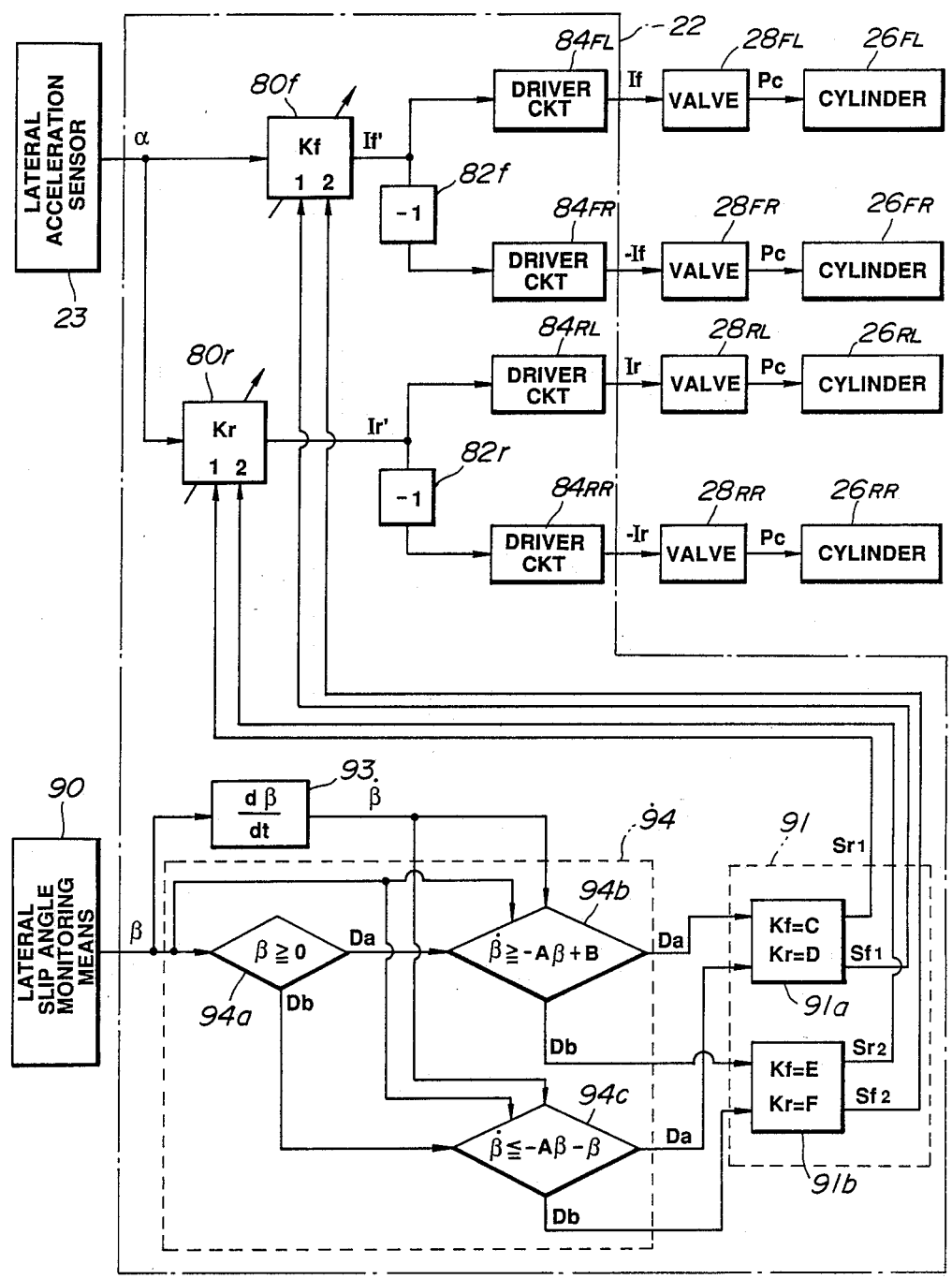
FIG. 12 is a schematic and illustrative block diagram of a modification of a control circuit to be employed in the preferred embodiment of the active suspension system according to the invention.

FIG. 12 shows a modification of the control circuit which can also be employed in the active suspension system according to the invention. In the shown modification, the discriminator circuit is modified from that in the former embodiment.

In the shown embodiment, the control circuit 22 is additionally provided with a differentiation circuit 93 which receives the lateral slip angle indicative signal $\beta$ from the lateral slip sensor 90. The differentiation circuit 93 differentiate the received lateral slip angle indicative signal $\beta$ by time to derive a lateral slip angular velocity indicative signal $\dot{\beta}$. On the other hand, the discriminator circuit 94 includes a first discriminator 94a which discriminates whether the value of the lateral slip angle indicative signal $\beta$ is greater than or equal to zero or not. As will be appreciated, the discriminator 94a thus discriminates the direction of cornering. The first discriminator 94a output HIGH level first discriminator signal Da when the lateral slip angle indicative signal value $\beta$ greater than or equal to zero and, otherwise, output HIGH level second discriminator signal Db. As set forth, since the lateral slip angle indicative signal becomes positive in response to right-hand cornering, the HIGH level first discriminator signal Da indicates occurrence of the right-hand cornering, and the HIGH level second discriminator signal Db indicatives occurrence of the left-hand cornering.

The discriminator circuit 94 also includes second and third discriminators 94b and 94c. The second discriminator 94b is designed to discriminate tightness of right-hand cornering utilizing preset constants A and B which are derived through experiments and for adapting characteristics of respective vehicle. Discrimination is performed whether the lateral slip angular velocity $\dot{\beta}$ is greater than or equal to a $(-A\beta + B)$. If the lateral slip angular velocity $\dot{\beta}$ is greater than or equal to $(-A\beta + B)$, the second discriminator 94b outputs HIGH level discriminator signal Da to the first gain control signal generator 91a. On the other hand, if the lateral slip angular velocity is smaller than $(-A\beta + B)$, then the HIGH level discriminator signal Db is output to the second gain control signal generator 91b.

Similarly to the above, the third discriminator 94c becomes active in response to the HIGH level discriminator signal Db of the first discriminator 94a. The third discriminator 94c is designed to discriminate tightness of left-hand cornering utilizing preset constants A and B. Discrimination is performed whether the lateral slip angular velocity $\dot{\beta}$ is smaller than or equal to a $(-A\beta + B)$. If the lateral slip angular velocity $\dot{\beta}$ is smaller than or equal to $(-A\beta + B)$, the second discriminator 94c outputs HIGH level discriminator signal Da to the first gain control signal generator 91a. On the other hand, if the lateral slip angular velocity is greater than $(-A\beta + B)$, then the HIGH level discriminator signal Db is output to the second gain control signal generator 91b.

Figure 13:
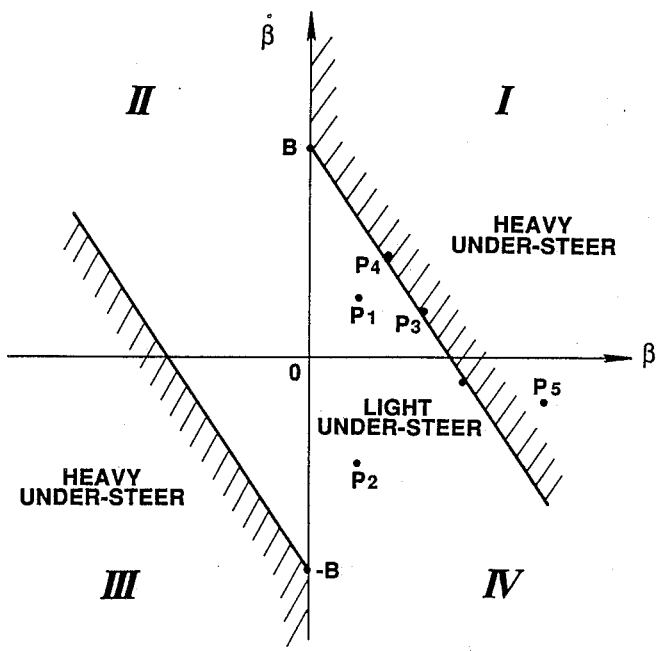
FIG. 13 is a chart showing variation of steering characteristics to be controlled in relation to a slip angle and slip angular velocity.

With the shown embodiment, steering characteristics control depending upon the lateral slip angle and the lateral slip angular velocity can be performed as shown in FIG. 13. Namely, in the two-directional coordinate system of the lateral slip angle and the lateral slip angular velocity, The regions I and III are the regions where the vehicle are turning the head and the regions II and IV are regions where the vehicle are returning the head to straight. Namely, as will be appreciated, in the regions I and III, the slip angle indicative signal $\beta$ and the lateral slip angular velocity indicative value $\dot{\beta}$ have the same signal polarity. On the other hand, in the regions II and IV, the lateral slip angle indicative signal and the lateral slip angular velocity indicative value have different polarity.

Assuming the right-hand steering is performed at normal moderate speed, the lateral slip angle $\beta$ is held small and also the lateral slip angular velocity $\dot{\beta}$ is held small. Because the steering behaviour is performed for right-hand cornering, both of the lateral slip angle indicative signal value $\beta$ and the lateral slip angular velocity $\dot{\beta}$ are positive. At this time, the driving condition indicative coordinate position on the coordinate system of FIG. 13 is P₁. Therefore, the HIGH level second discriminator signal Db is supplied to the second gain control signal generator 92b from the second discriminator 94b for providing light under-steer characteristics for the vehicle.

Subsequently, the vehicle returns to straight. Then, the lateral slip angle $\beta$ is gradually decreased. Therefore, the lateral slip angular velocity $\dot{\beta}$ becomes negative. Therefore, the driving position indicative coordinate position enters into the region II, as shown by point P₂ in FIG. 13. Therefore, as long as the steering behaviour is moderately taken place, the cornering characteristics of the vehicle can be maintained at light under-steer.

On the other hand, by performing abrupt steering, the lateral slip angle $\beta$ and the lateral slip angular velocity $\dot{\beta}$ enters in the region a of FIG. 13. Then, the first discriminator signal Da of the second discriminator 94b becomes HIGH level to trigger the first gain control signal generator 92a. Therefore, the steering characteristics is changed into heavier under-steer characteristics. In this, the steering characteristics can be changed with higher response depending on the lateral slip angle and the lateral slip angular velocity.

Figure 14:
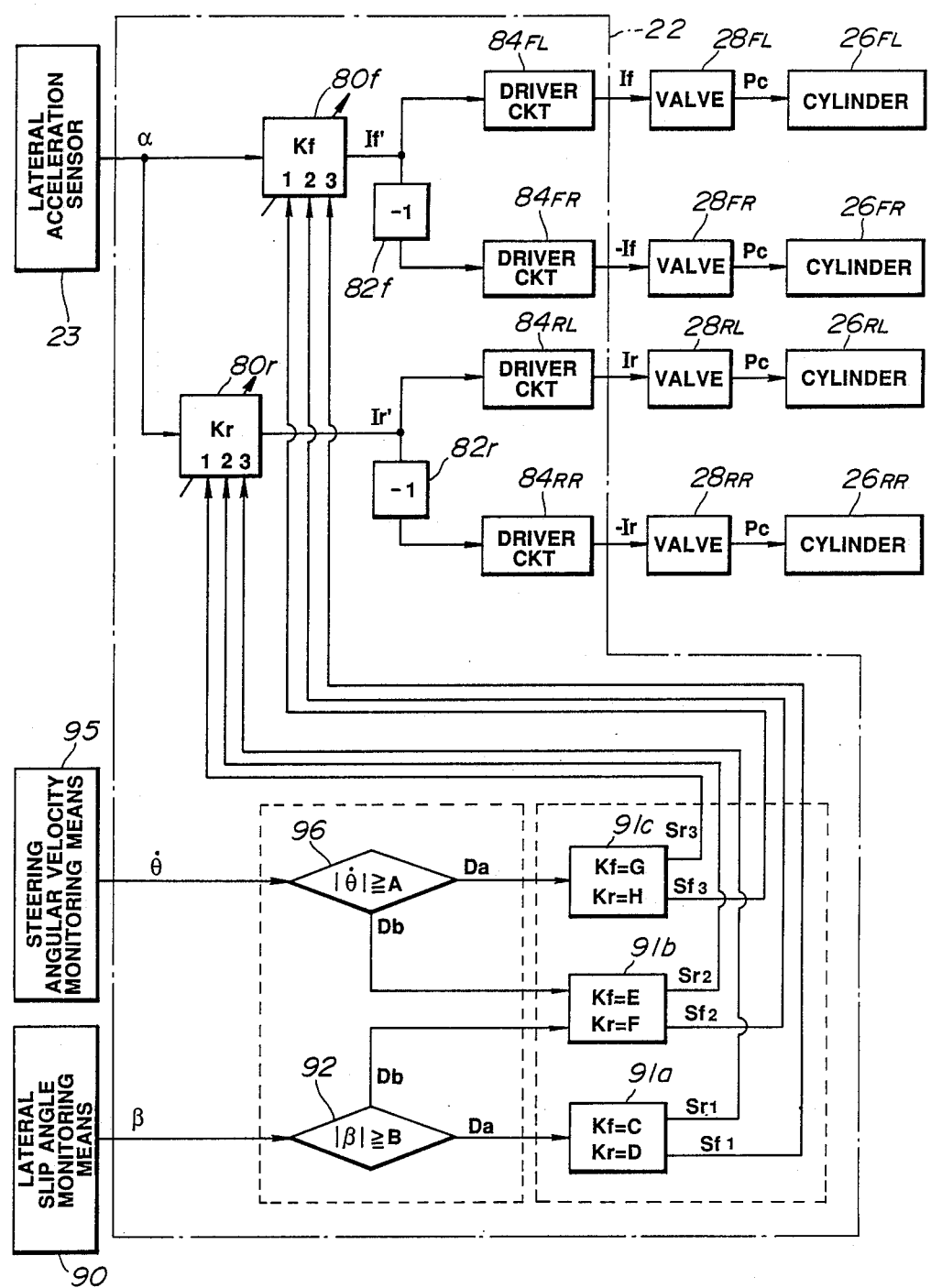
FIG. 14 is a schematic and illustrative block diagram of a another modification of a control circuit to be employed in the preferred embodiment of the active suspension system according to the invention.

FIG. 14 shows another modification of the control circuit for the active suspension system according to the invention. In this embodiment, a steering angular velocity detecting circuit 95 is employed for monitoring steering angular velocity. The steering angular velocity detecting circuit 95 includes a steering angle sensor monitoring steering angular displacement and producing a steering angle indicative signal, and a differentiation circuit for differentiating the steering angle indicative signal for deriving a steering angular velocity. However, it is also possible to employ a steering angular velocity sensor for directly monitoring the steering angular velocity.

The steering angular velocity detecting circuit 95 outputs a steering angular velocity indicative signal $\dot{\theta}$. The control unit 22 includes a discriminator 92 which compares the absolute value $|\beta|$ of the lateral slip angle indicative signal with the reference slip angle indicative value $\beta_0$ for selectively feeding HIGH level discriminator signals Da and Db to the first and second gain control signal generators 91a and 91b. The control unit 22 further has another discriminator 96 which compares the absolute value $|\dot{\theta}|$ with a predetermined threshold value $\theta_0$ to produce HIGH level first discriminator signal Da when the absolute value $|\dot{\theta}|$ is greater than or equal to the threshold value $\theta_0$, and to produce HIGH level second discriminator signal Db when the absolute value $|\dot{\theta}|$ is smaller than the threshold value $\theta_0$. The discriminator 96 feeds the first discriminator signal Da to a third gain control signal generator 91c and the second discriminator signal Db to the second gain control signal. The third gain control signal generator 91c is triggered by the HIGH level first discriminator signal Da of the discriminator 96 to output a third front gain control signal Sf₃ and a third rear gain control signal Sr₃. The third front and third rear gain control signals Sf₃ and Sr₃ respectively adjust gains Kf and Kr at G and H. The set gains G and H are equal values to each other.

The first, second and third gain control signals Sf₁, Sr₁, Sf₂, Sr₂, Sf₃ and Sf₃ are given priorities such that the third gain control signals have the highest priority and the second gain control signals have the lowest priority.

Figure 15:
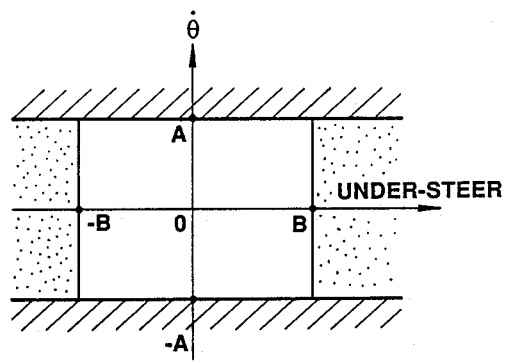
FIG. 15 is a chart showing variation of steering characteristics to be controlled in relation to a slip angle and steering angular velocity.

By this, when the steering angular velocity $\dot{\theta}$ is greater than threshold value $\theta_0$, the neutral steering characteristics can be provided, as shown in FIG. 15. By providing the neutral steer characteristics, turning ability can be increased for easier turn at the initial period of steering operation in which the steering angular velocity becomes large.

Though the shown embodiment utilized the neutral steer characteristics at the initial period of steering operation, it may be possible to temporarily use over-steer characteristics at initial period of steering for further improving steerability.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An anti-rolling control system for an automotive suspension system comprising:
   a front suspension system disposed between a vehicular body and a suspension member rotatably supporting a front wheel, said front suspension system defining a working chamber filled with a working fluid and variable of the fluid pressure within said working chamber for adjusting suspension characteristics;
   a rear suspension system disposed between a vehicular body and a suspension member rotatably supporting a rear wheel, said suspension system defining a working chamber filled with a working fluid and variable of the fluid pressure within said working chamber for adjusting suspension characteristics;
   first pressure control valve means associated with said working chamber of said front suspension system for controlling introduction and draining of working fluid into and from said working chamber for adjusting the fluid pressure therein;
   second pressure control valve means associated with said working chamber of said rear suspension system for controlling introduction and draining of working fluid into and from said working chamber for adjusting the fluid pressure therein;
   means for monitoring vehicular rolling magnitude for producing a rolling magnitude indicative signal;
   means for monitoring a vehicular driving parameter representative of demand for vehicular stability factor for producing a stability factor demand indicative signal representative thereof;
   means for deriving first and second control signals on the basis of said rolling magnitude indicative signal and first and second coefficient values order to control said first and second pressure control valve means for inducing counter rolling at a controlled magnitude, said control signal deriving means varying said first and second coefficient values depending upon said stability factor demand indicative signal value so as to vary vehicular steering characteristics.

2. An anti-rolling control system as set forth in claim 1, wherein said control signal deriving means detects said stability factor demand indicative signal value greater than or equal to a stability factor criterion for varying vehicular steering characteristics toward under-steer characteristics.

3. An anti-rolling control system as set forth in claim 2, wherein said control signal deriving means sets said vehicular steering characteristics at light under-steer characteristics when said stability factor demand indicative signal value is smaller than said criterion.

4. An anti-rolling control system as set forth in claim 1, wherein said control signal deriving means varies ratio of counter rolling magnitude at front and rear suspension systems for varying vehicular steering characteristics.

5. An anti-rolling control system as set forth in claim 4, wherein said control signal deriving means varies each of said first and second coefficients at least between predetermined a greater value and a smaller value on the basis of said stability factor demand indicative signal value.

6. An anti-rolling control system as set forth in claim 5, wherein said control signal deriving means compares said stability factor demand indicative signal value with a predetermined criterion for setting said greater value for each of said first and second coefficients when said stability factor demand indicative signal value is greater than or equal to said criterion, and otherwise setting said smaller value.

7. An anti-rolling control system as set forth in claim 4, wherein said rolling magnitude monitoring means comprises a lateral acceleration sensor for monitoring a lateral acceleration exerted on the vehicle body and producing a lateral acceleration indicative signal as said rolling magnitude indicative signal.

8. An anti-rolling control system as set forth in claim 6, wherein said stability factor demand monitoring means comprise a lateral slip angle sensor for monitoring lateral slip angle for producing a lateral slip angle indicative signal as said stability factor demand indicative signal.

9. An anti-rolling control system as set forth in claim 8, which further comprises means, receiving said lateral slip angle indicative signal, for deriving a lateral slip angular velocity, and said control signal deriving means varies said first and second coefficients on the basis of said lateral slip angle indicative signal and said lateral slip angular velocity.

10. An anti-rolling control system as set forth in claim 9, wherein said control signal deriving means varies said criterion to be compared with said lateral slip angle indicative signal on the basis of said lateral slip angular velocity.

11. An anti-rolling control system as set forth in claim 10, wherein said control signal deriving means varies said criterion to decrease according to increasing of absolute value of said lateral slip angular velocity when said lateral slip angle indicative signal and said lateral slip angular velocity are in the same polarities to each other, and to increase according to increasing of absolute value of said lateral slip angular velocity when the polarities of said lateral slip angle indicative signal and said lateral slip angular velocity are different from each other.

12. An anti-rolling control system as set forth in claim 9, which further comprises means for monitoring steering angular velocity for generating a steering angular velocity indicative signal, and said control signal deriving means compares said steering angular velocity indicative signal with a predetermined steering angular velocity threshold for setting said first and second coefficient at equal values when said steering angular velocity is greater than ore equal to said steering angular velocity threshold.

13. An anti-rolling control system as set forth in claim 9, which further comprises means for monitoring steering angular velocity for generating a steering angular velocity indicative signal, and said control signal deriving means compares said steering angular velocity indicative signal with a predetermined steering angular velocity threshold for setting first coefficient to be smaller than said second coefficient when said steering angular velocity is greater than ore equal to said steering angular velocity threshold.

14. An anti-rolling control system for an automotive suspension system comprising:
a front suspension system disposed between a vehicular body and a suspension member rotatably supporting a front wheel, said front suspension system defining a working chamber filled with a working fluid and variable of the fluid pressure within said working chamber for adjusting suspension characteristics;
a rear suspension system disposed between a vehicular body and a suspension member rotatably supporting a rear wheel, said suspension system defining a working chamber filled with a working fluid and variable of the fluid pressure within said working chamber for adjusting suspension characteristics;
first pressure control valve means associated with said working chamber of said front suspension system for controlling introduction and draining of working fluid into and from said working chamber for adjusting the fluid pressure therein;
second pressure control valve means associated with said working chamber of said rear suspension system for controlling introduction and draining of working fluid into and from said working chamber for adjusting the fluid pressure therein,
means for monitoring vehicular rolling magnitude for producing a rolling magnitude indicative signal;
means for monitoring a vehicular driving parameter affecting for vehicular stability factor for producing a parameter signal representative thereof
means for deriving first and second control signals on the basis of said rolling magnitude indicative signal and first and second coefficient values order to control said first and second pressure control valve means for suppressing vehicular rolling, said control signal deriving means varying said first and second coefficient values depending upon said parameter signal value.

15. An anti-rolling control system as set forth in claim 14, wherein said control signal deriving means varies each of said first and second coefficients at least between predetermined a greater value and a smaller value on the basis of said parameter signal value.

16. An anti-rolling control system as set forth in claim 15, wherein said control signal deriving means compares said parameter signal value with a predetermined criterion for setting said greater value for each of said first and second coefficients when said parameter signal value is greater than or equal to said criterion, and otherwise setting said smaller value.

17. An anti-rolling control system as set forth in claim 14, wherein said rolling magnitude monitoring means comprises a lateral acceleration sensor for monitoring a lateral acceleration exerted on the vehicle body and producing a lateral acceleration indicative signal as said rolling magnitude indicative signal.

18. An anti-rolling control system as set forth in claim 16, wherein said stability factor influencing parameter monitoring means comprise a lateral slip angle sensor for monitoring lateral slip angle for producing a lateral slip angle indicative signal as said parameter signal.

19. An anti-rolling control system as set forth in claim 18, which further comprises means, receiving said lateral slip angle indicative signal, for deriving a lateral slip angular velocity, and said control signal deriving means varies said first and second coefficients on the basis of said lateral slip angle indicative signal and said lateral slip angular velocity.

20. An anti-rolling control system as set forth in claim 19, wherein said control signal deriving means varies said criterion to be compared with said lateral slip angle indicative signal on the basis of said lateral slip angular velocity.

21. An anti-rolling control system as set forth in claim 19, wherein said control signal deriving means varies said criterion to decrease according to increasing of absolute value of said lateral slip angular velocity when said lateral slip angle indicative signal and said lateral slip angular velocity are in the same polarities to each other, and to increase according to increasing of absolute value of said lateral slip angular velocity when the polarities of said lateral slip angle indicative signal and said lateral slip angular velocity are different from each other.

22. An anti-rolling control system as set forth in claim 18, which further comprises means for monitoring steering angular velocity for generating a steering angular velocity indicative signal, and said control signal deriving means compares said steering angular velocity indicative signal with a predetermined steering angular velocity threshold for setting said first and second coefficient at equal values when said steering angular velocity is greater than ore equal to said steering angular velocity threshold.

23. An anti-rolling control system as set forth in claim 18, which further comprises means for monitoring steering angular velocity for generating a steering angular velocity indicative signal, and said control signal deriving means compares said steering angular velocity indicative signal with a predetermined steering angular velocity threshold for setting first coefficient to be smaller than said second coefficient when said steering angular velocity is greater than ore equal to said steering angular velocity threshold.

* * * * *